United States Patent
Kang

Patent Number: 5,959,422
Date of Patent: Sep. 28, 1999

[54] DEVICE FOR AND METHOD OF CONTROLLING VIBRATIONS OF A TWO-INERTIAL RESONANT SYSTEM

[75] Inventor: Joon-Hyuk Kang, Seoul, Rep. of Korea

[73] Assignee: Samsung Electronics Co., Ltd., Suwon, Rep. of Korea

[21] Appl. No.: 09/046,681

[22] Filed: Mar. 24, 1998

[30] Foreign Application Priority Data

Mar. 25, 1997 [KR]  Rep. of Korea ................. 97-10313

[51] Int. Cl.[6] ................. G05B 13/00; G05B 11/36
[52] U.S. Cl. ................. 318/561; 318/609; 318/623
[58] Field of Search ................. 318/623, 630, 318/561, 566, 606–610; 364/161

[56] References Cited

U.S. PATENT DOCUMENTS

| | | | |
|---|---|---|---|
| 5,442,270 | 8/1995 | Tetsuaki | 318/568.22 |
| 5,477,114 | 12/1995 | Yamada et al. | 318/457 |
| 5,525,877 | 6/1996 | Umida | 318/432 |
| 5,545,957 | 8/1996 | Kubo et al. | 318/432 |
| 5,729,111 | 3/1998 | Ogura et al. | 318/623 |

*Primary Examiner*—Brian Sircus
*Attorney, Agent, or Firm*—Staas & Halsey

[57] ABSTRACT

A device and a method of controlling the vibrations of a two-inertial resonant system. The method includes the steps of detecting the electrical torque and the speed of a motor to evaluate the speed and the disturbance torque of a load, and a torsional torque generated by a difference in position between the driving means and the load; evaluating the acceleration of the load from the evaluated disturbance torque of the load and the torsional torque, and conducting a PI control by using the difference between the evaluated speed of the load and a reference speed of the load; and controlling the motor by using the difference between the evaluated acceleration of the load and the reference speed of the PI-controlled load.

5 Claims, 2 Drawing Sheets

DEVICE FOR AND METHOD OF CONTROLLING VIBRATIONS OF A TWO-INERTIAL RESONANT SYSTEM

BACKGROUND OF THE INVENTION

1. Field of the Invention

The present invention relates to a device and method of controlling a two-inertial resonant system and, more particularly, to a device for and method of controlling the vibrations of a two-inertial resonant system by using a state observer.

2. Description of the Related Art

A two-inertial resonant system, which has two moments of inertia, that is, a motor and a load connected to each other by the axis of a spring stiffness as shown in FIG. 1, is of great significance as a first approximate model for the spring joints and the flexible arms of a robot, space structures and the like.

FIG. 2 illustrates a dynamic model of such a two-inertial resonant system.

Referring to FIG. 2, a torsional torque $T_T$ generated by the difference in position between a motor and an actual load works as the load torque towards the motor. The difference between an electrical torque "u" and the torsional torque $T_T$ determines the motor's actual speed of revolution "ω".

The torsional torque $T_T$, which acts as the load torque in the motor, is added to a disturbance torque $T_L$ externally applied, thereby determining the speed $\omega_L$ of the actual load.

Here, J is the motor's moment of inertia, $T_1$ is the load's moment of inertia, and K is the stiffness coefficient. Further, θ is the position of the axis of the motor, ω is the speed of the motor, $\theta_L$ is the position of the load, $\omega_L$ is the speed of the load and $T_e$ is the motor torque.

In such a conventional two-inertial system, the position and the speed of the motor differ from those of the actual load in case of a sudden acceleration or deceleration since a motor is connected with the actual load via the axis of a spring stiffness.

Thus, the stability of the system may deteriorated deteriorate with vibrations produced when the motor's driving speed is controlled by the conventional method.

FIG. 3 is an illustration of a control system of a conventional two-inertial resonant system using a PI (Proportional Integral) controller, wherein reference numeral 20 denotes the two-inertial resonant system as shown in FIG. 2 and reference numeral 10 indicates a PI controller 10.

$K_P$ $K_I$ and $K_L$ are the speed proportional gain, the integral gain and the differential load acceleration feedback gain, respectively.

The speed feedback to the PI controller 10 is not the speed $\omega_L$ of the actual load to be controlled, but the speed ω of the motor detected by a sensor.

The speed ω of the motor detected by the sensor installed on the motor's axis is fed back to the PI controller 10, determining the speed difference from the reference speed ω* of the load. The PI controller 10 determines the sum of a component $K_P$ proportional to the speed difference and another component $K_L$ proportional to the integrated value of the speed difference.

The output of the PI controller 10 is applied as a torque command which is generated by the motor.

Under a torque "u" as a torque command generated by the motor, the speed $\omega_L$ of the actual load and the speed ω of the motor are both determined by the dynamics of the two-inertial resonant system as illustrated in FIG. 2. A sensor detects the motor's speed ω, which will be fed back to the PI controller 10 for the calculation of the speed difference from the reference speed ω* of the load.

In the conventional method of controlling the vibrations of a two-inertial resonant system, the speed feedback to the PI controller 10 is not the speed $\omega_L$ of the actual load, which is to be controlled, but the speed ω of the motor detected by the sensor attached to the axis of the motor that is a driving component.

Furthermore, the motor and the actual load are connected with each other through the axis of a spring stiffness so that the position and the speed of the motor differ from those of the actual load in case of a sudden acceleration or deceleration. These differences in position and speed result in vibrations by the action of the torsional torque working as the load torque, as well as an increase in the system's instability.

SUMMARY OF THE INVENTION

Accordingly, the present invention is directed to a device for and method of controlling the vibrations of a two-inertial resonant system that substantially obviates one or more of the problems incurred due to limitations and disadvantages of the related art.

An object of the present invention is to provide a device for and method of controlling the vibrations of a two-inertial resonant system by evaluating the speed and the disturbance torque of a load with a state observer, thereby preventing the performance deterioration of the system which is caused by the vibrations usually generated in the course of controlling the two-inertial resonant system using only a PI controller.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of controlling vibrations of a two-inertial resonant system includes the steps of: detecting the electrical torque and the position of a motor to evaluate the speed and the disturbance torque of a load; evaluating the acceleration of the load from the speed and the disturbance torque of the load, and conducting a PI control by using the difference between the evaluated speed of the load and a reference speed of the load; and controlling the motor by using the difference between the evaluated acceleration of the load and the reference speed of the PI-controlled load.

A device for controlling vibrations of a two-inertial resonant system includes: a two-inertial resonant system having a motor and a load connected with each other via the axis of a spring stiffness; a state observer for detecting the torque and the position of the motor to evaluate the speed and the disturbance torque of a load; a load acceleration evaluator for evaluating the acceleration of the load from the speed and the disturbance torque of the load determined by the state observer; and a PI controller for conducting a PI control of a reference speed of the load and the evaluated speed of the load.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention, wherein the reference numerals refer to like elements throughout:

DETAILED DESCRIPTION OF PREFERRED EMBODIMENT

Reference will now be made in detail to the preferred embodiments of the present invention, examples of which are illustrated in the accompanying drawings.

Figure 1:
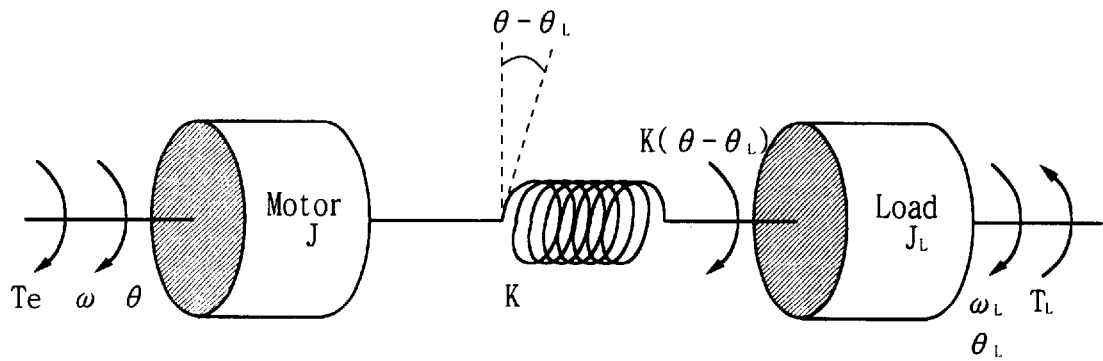
FIG. 1 is a view of a conventional two-inertial resonant system.
Figure 2:
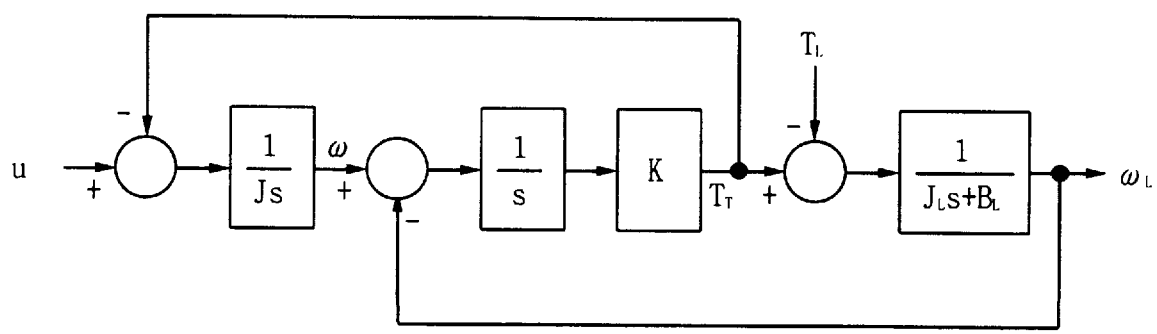
FIG. 2 is an illustration of a dynamic model of the two-inertial resonant system shown in FIG. 1.
Figure 3:
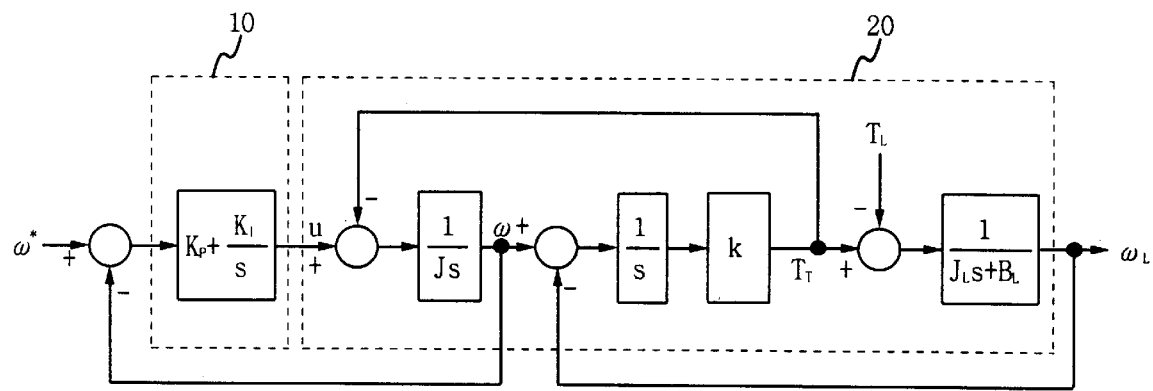
FIG. 3 is an illustration of a dynamic model of a two-inertial resonant system using a conventional PI controller.
Figure 4:
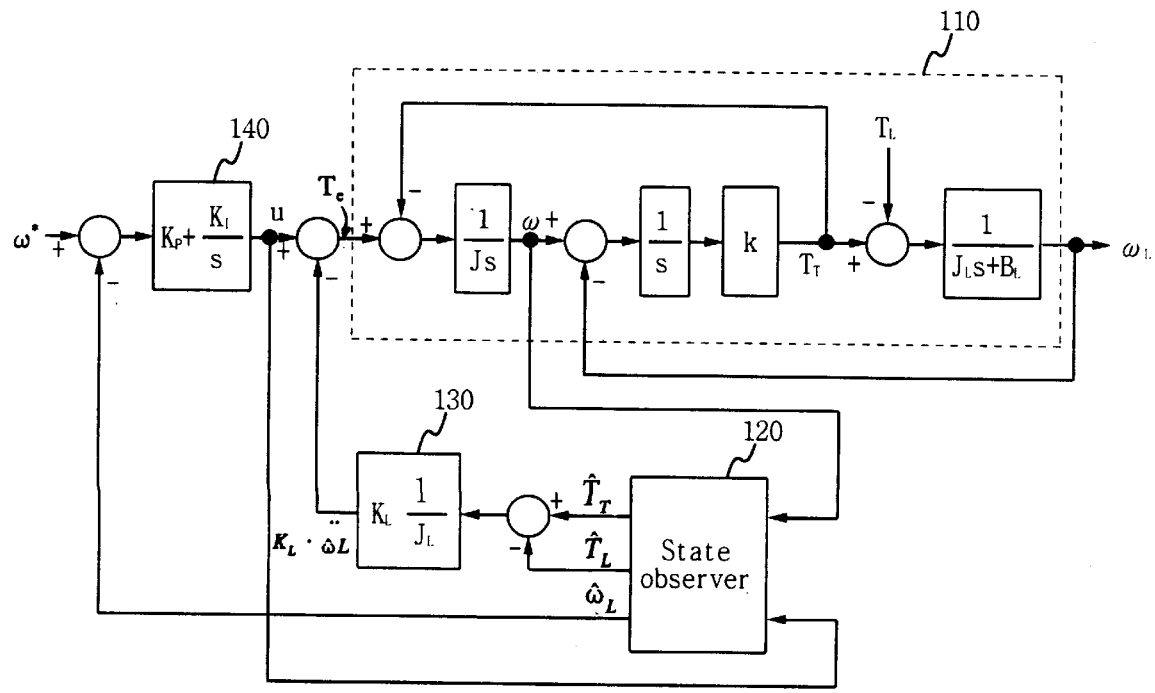
FIG. 4 is an illustration of a dynamic model of a two-inertial resonant system having a vibration controller according to an embodiment of the present invention.

FIG. 4 is a diagram of a dynamic model of a two-inertial resonant system having a vibration controller in accordance with the present invention.

The device as shown in FIG. 4 includes a two-inertial resonant system 110 having two moments of inertia which are connected with each other via the axis of a spring stiffness; a state observer 120 for detecting the torque and the speed of a motor to evaluate the speed $\omega_L$ and the disturbance torque $T_L$ of a load, and the torsional torque $T_T$; a load acceleration evaluator 130 for evaluating the acceleration of the load from the evaluated torsional torque $\hat{T}_T$ and the disturbance torque $\hat{T}_L$ of the load determined by the state observer 120; and a PI controller 140 for conducting a PI control with a reference speed $\omega^*$ of the load and the evaluated speed $\hat{\omega}_L$ of the load.

On the assumption that the disturbance torque $T_L$ of the two-inertial resonant system 120 is constant with respect to time, the state variables are load speed $\omega_L$, disturbance torque $T_L$, motor speed $\omega$ and torsional torque $T_T$, and the motor speed $\omega$ is the detectable output in response to a motor torque $T_e$ applied as an input, the two-inertial resonant system 110 can be explained by the state equation like Equation 1.

$$\dot{x}=Ax+Bu, \ y=C^T x \quad \text{[Equation 1]}$$

The constants and variables of Equation 1 are given as in Equation 2.

$$A = \begin{bmatrix} -\dfrac{B_L}{J_L} & -\dfrac{1}{J_L} & \dfrac{1}{J_L} & 0 \\ 0 & 0 & 0 & 0 \\ -K & 0 & 0 & K \\ 0 & 0 & -\dfrac{1}{J} & 0 \end{bmatrix}, x = \begin{bmatrix} \omega_L \\ T_L \\ T_T \\ \omega \end{bmatrix}, B = \begin{bmatrix} 0 \\ 0 \\ 0 \\ 1 \end{bmatrix} \quad \text{[Equation 2]}$$

$$u = T_e, y = \omega, C^T = [0 0 0 1]$$

Here, J is the motor's moment of inertia, $J_L$ is the load's moment of inertia, and K is the stiffness coefficient.

The state equation of the two-inertial resonant system 110 including a full order observer 120 of the present invention may be expressed by Equation 3.

$$\dot{\hat{x}}=A\hat{x}+Bu+L(y-\hat{y}), \ \hat{y}=C^T\hat{x} \quad \text{[Equation 3]}$$

where $\hat{x}$ is the evaluated state and L is the observer gain matrix, both of which are given by Equation 4.

$$\hat{x}=[\hat{\omega}_L \ \hat{T}_L \ \hat{T}_T \ \hat{\omega}]^T, L=[l_1 \ l_2 \ l_3 \ l_4]^T \quad \text{[Equation 4]}$$

We can rewrite the equation in the form of Equation 5 by using Equations 2 and 3, wherein $B_L$ approximates to zero and is thus ignored.

$$\dot{\hat{\omega}}_L = \frac{1}{J_L}\hat{T}_T - \frac{1}{J_L}\hat{T}_L + l_1(\omega - \hat{\omega}) \quad \text{[Equation 5]}$$

$$\dot{\hat{T}}_L = l_2(\omega - \hat{\omega})$$

$$\dot{\hat{T}}_T = K(\omega - \hat{\omega}) + l_3(\omega - \hat{\omega})$$

$$\dot{\hat{\omega}} = -\frac{1}{J}\hat{T}_T + T_e + l_4(\omega - \hat{\omega})$$

To see how the determination of the observer gain matrix L as shown in Equation 4 is made, the characteristic polynomial $\Delta(s)$ of the matrix $A \cdot LC^T$ is first calculated by Equation 6.

$$\Delta(s) \overset{\Delta}{=} \det[sI - A + LC^T] \quad \text{[Equation 6]}$$

$$= s^4 + l_4 s^3 + \left\{-l_3 + \left(\frac{1}{J} + \frac{1}{J_L}\right)K\right\}s^2 +$$

$$\left(\frac{l_1}{J} + \frac{l_4}{J_L}\right)Ks - \frac{l_2 K}{J_L J}$$

The observer gain is determined so that the characteristic polynomial $\Delta(s)$ satisfies s=$-\lambda$ and $\lambda$>0.

Thus, we may rewrite the characteristic polynomial $\Delta(s)$ as Equation 7.

$$\Delta(s) = s^4 + l_4 s^3 + \left\{-l_3 + \left(\frac{1}{J} + \frac{1}{J_L}\right)K\right\}s^2 + \quad \text{[Equation 7]}$$

$$\left(\frac{l_1}{J} + \frac{l_4}{J_L}\right)Ks - \frac{l_2 K}{J_L J}$$

$$= (s+\lambda)^4 = s^4 + 4\lambda s^3 + 6\lambda^2 s^2 + 4\lambda^3 s + \lambda^4$$

According to Equation 7, the observer gain is given by Equation 8.

$$l_4 = 4\lambda, \ l_3 = -6\lambda^2 + \left(\frac{1}{J} + \frac{1}{J_L}\right)K, \quad \text{[Equation 8]}$$

$$l_2 = J\left(-\frac{l_4}{J_L} + \frac{4\lambda^3}{K}\right), \ l_1 = -\frac{\lambda^4 J_L J}{K}$$

The evaluated load acceleration $\ddot{\hat{\omega}}_L$ can be derived by writing Equation 9 from Equation 1 and the evaluated torsional torque $\hat{T}_T$ and the evaluated disturbance torque $\hat{T}_L$ in Equation 5.

$$\ddot{\omega}_L = \frac{s}{J_L}[\hat{T}_T - \hat{T}_L] \quad \text{[Equation 9]}$$

The controller of the present invention, which reduces the vibrations of the two-inertial resonant system by means of the evaluated load speed $\hat{\omega}_L$ and the evaluated load acceleration $\ddot{\omega}_L$ calculated from Equations 5 and 9, is a combination of a conventional PI controller and the feedback components of a differential load acceleration and an observed speed. The motor torque $T_e$ of the controller can be expressed by Equation 10.

$$T_e = K_P(\omega* - \hat{\omega}) + K_I \int (\omega* - \hat{\omega})dt - K_L\ddot{\omega}_L \quad \text{[Equation 10]}$$

where $K_P$, $K_I$ and $K_L$ are the speed proportional gain, the integral gain and the differential load acceleration feedback gain, respectively.

In contrast to the feedback component of the speed actually calculated by Equation 10, that of the observed speed attenuates the high-frequency vibrations caused by the errors in the calculation of the speed. Additionally, $-K_L\ddot{\omega}_L$ reduce the vibrations by the disturbance torque and the torsional torque which are applied to the motor due to the difference in position between the motor and the load.

Consequently, the controller for reducing the vibrations of the two-inertial resonant system can be expressed by Equations 5, 8, 9 and 10.

As described above, the present invention can evaluate the load's speed and disturbance torque by way of an observer theory to control the two-inertial resonant system without vibrations and therefore can be used in all sorts of industrial electronic equipment with a consequence of a more stabilized performance.

It will be apparent to those skilled in the art that various modifications and variations can be made in the device for and method of controlling the vibrations of a two-inertial resonant system according to the present invention without departing from the spirit or scope of the invention. Thus, it is intended that the present invention cover the modifications and variations of this invention provided they come within the scope of the appended claims and their equivalents.

What is claimed is:

1. A method of controlling vibrations of a two-inertial resonant system including driving means and a load, comprising the steps of:

detecting an electrical torque and a speed of the driving means, to evaluate a speed and a disturbance torque of the load, and a torsional torque generated by a difference in position between the driving means and the load;

evaluating an acceleration of the load from the torsional torque and the disturbance torque of the load, and conducting a proportional integral PI control by using a difference between the evaluated speed of the load and a reference speed of the load; and controlling the driving means by using a difference between the evaluated acceleration of the load and the reference speed of the PI-controlled load.

2. A method of controlling vibrations of a two-inertial resonant system including a drive unit and a load, comprising the steps of:

detecting an electrical torque and a speed of the drive unit;

using the detected electrical torque and speed of the drive unit to evaluate, with a state observer, the speed of the load, a disturbance torque of the load and a torsional torque between the drive unit and the load;

feeding back the evaluated speed of the load as a reference speed;

evaluating an acceleration of the load based on the disturbance torque of the load and the torsional torque between the drive unit and the load; and feeding back the evaluated acceleration to the electrical torque.

3. A device for controlling vibrations of a two-inertial resonant system, comprising:

a two-inertial resonant system having driving means and a load connected with each other via an axis of a spring stiffness;

a state observer to detect a torque and a speed of the driving means, to evaluate a speed and a disturbance torque of the load, and a torsional torque generated by a difference in position between the driving means and the load;

a load acceleration evaluator to evaluate an acceleration of the load from the torsional torque and the disturbance torque of the load determined by the state observer; and a proportional integral controller to conduct a PI control of a reference speed of the load and the evaluated speed of the load.

4. A device for controlling vibrations of a two-inertial resonant system, comprising:

a two-inertial resonant system having a driving unit and a load;

a Proportional Integral (PI) controller to perform a PI control of a reference speed and an evaluated speed of the load, to generate a PI controlled signal;

a state observer to evaluate a speed and a disturbance torque of the load, and a torsional torque generated by a difference in position between the driving means and the load, from a speed of the driving unit and the PI controlled signal;

a first subtracter to subtract the disturbance torque of the load from the torsional torque, to generate a first subtracted signal;

a load acceleration evaluator to evaluate an acceleration of the load based upon the first subtracted signal; and a second subtracter to subtract the evaluated acceleration of the load from the PI controlled signal, to generate a second subtracted signal, and transmitting the second subtracted signal to said two-inertial resonant system as a torque command of the motor.

5. The device as claimed in claim 4, wherein said load acceleration evaluator uses a component proportional to an integrated value of a difference in the speed of the motor and the reference speed, and a moment of inertia of the load, on the first subtracted signal, to evaluate the acceleration of the load.

* * * * *